United States Patent [19]
Sultan et al.

[11] Patent Number: 5,788,376
[45] Date of Patent: Aug. 4, 1998

[54] TEMPERATURE SENSOR

[75] Inventors: Michel Farid Sultan, Troy; Michael James O'Rourke, Warren, both of Mich.

[73] Assignee: General Motors Corporation, Detroit, Mich.

[21] Appl. No.: 924,914

[22] Filed: Sep. 8, 1997

Related U.S. Application Data

[63] Continuation of Ser. No. 673,551, Jul. 1, 1996, abandoned.

[51] Int. Cl.⁶ .............................. G01K 7/34; H01G 7/04
[52] U.S. Cl. ............................... 374/184; 361/282
[58] Field of Search ................... 374/184, 163; 361/282

[56] References Cited

U.S. PATENT DOCUMENTS

| | | | |
|---|---|---|---|
| 2,818,732 | 1/1958 | Bennett | 374/184 |
| 3,257,607 | 6/1966 | Pintell | 374/184 |
| 3,266,316 | 8/1966 | Jones et al. | |
| 3,303,701 | 2/1967 | Matsuura et al. | |
| 3,338,100 | 8/1967 | Takami | 374/184 |
| 3,421,374 | 1/1969 | Wieting et al. | 374/184 |
| 3,673,305 | 6/1972 | Mashikian et al. | 174/12 |
| 3,706,919 | 12/1972 | Abbe | 317/246 |
| 3,759,104 | 9/1973 | Robinson | 374/184 |
| 4,894,785 | 1/1990 | Fernandes | 364/483 |
| 4,924,701 | 5/1990 | Delatorre | 73/722 |
| 5,444,727 | 8/1995 | Mathoorasing | 327/38 |
| 5,451,786 | 9/1995 | Kosai | 374/184 |
| 5,456,108 | 10/1995 | Birkett | 73/290 V |
| 5,479,104 | 12/1995 | Cambell | 324/690 |
| 5,483,414 | 1/1996 | Turtiainen | 361/282 |

FOREIGN PATENT DOCUMENTS

| | | | |
|---|---|---|---|
| 0137013 | 8/1979 | Germany | 361/282 |
| 2158229 | 11/1985 | United Kingdom | 361/282 |

OTHER PUBLICATIONS

The Physical Properties of Glass, D. G. Holloway University of Keele; The Wykeham Science Series, Wykeham Publications (London) Ltd.; pp. 50–79 (1973).

Dielectric Materials and Applications; Papers by Twenty-Two Contributors; Arthur R. Von Hippel, Editor; Jointly Published by The Tech. Press of M.I.T.; pp. 397–398 (no date).

Primary Examiner—Diego F. F. Gutierrez
Attorney, Agent, or Firm—Anthony Luke Simon

[57] ABSTRACT

A temperature sensor apparatus comprising: a capacitor with first and second conductors and a dielectric material between the conductors; a frequency generator coupled to the capacitor and providing an excitation signal thereto; a processor coupled to the capacitor, wherein the processor monitors a capacitance of the capacitor, converts the capacitance to a temperature signal, and alters a frequency of the excitation signal when the temperature signal passes a predetermined threshold.

4 Claims, 3 Drawing Sheets

1
TEMPERATURE SENSOR

This is a continuation of application Ser. No. 08/673,551 filed on Jul. 1, 1996, now abandonded.

BACKGROUND OF THE INVENTION

Temperature sensing in high temperature environments such as automotive vehicle exhaust systems, is typically done using thermistors constructed of materials capable of withstanding the high temperature environment. Such thermistors tend to be costly, especially when high accuracy is required, and difficult to calibrate.

SUMMARY OF THE PRESENT INVENTION

Advantageously, this invention provides a temperature sensor with a capacitive structure having physical characteristics that change with temperature, which changes are reflected in the output capacitance of the structure.

Advantageously, this invention provides a temperature sensor having a capacitive structure that is easily tuned electronically and that is suitable for temperature sensing over a wide range of temperatures, including high temperatures of a type found in automotive vehicle exhaust systems.

Advantageously, according to a preferred example, a temperature sensor according to this invention is provided comprising a capacitor with first and second conductors and a dielectric material between the conductors, a frequency generator coupled to the capacitor and providing an excitation signal thereto, and a processor coupled to the capacitor, wherein the processor comprises: means for monitoring a capacitance of the capacitor, means for converting the capacitance to a temperature signal, and means for altering a frequency of the excitation signal when the temperature signal passes a predetermined threshold.

Advantageously, according to another preferred example, the capacitor is constructed having an inner conductive cylindrical member and an outer conductive cylindrical member, wherein the inner and outer conductive cylindrical members are concentrically and coaxially aligned, wherein an outer periphery of the inner cylindrical conductive member is spaced a predetermined distance from an inner periphery of the outer cylindrical conductive member, a dielectric material is provided between the outer periphery of the inner cylindrical member and the inner periphery of the outer cylindrical member, wherein the dielectric is bonded to the inner cylindrical member and the outer cylindrical member and maintains the inner and outer cylindrical members affixed together.

BRIEF DESCRIPTION OF THE DRAWINGS

The present invention will now be described by way of example with reference to the following figures in which.

DETAILED DESCRIPTION OF THE INVENTION

Figure 1:
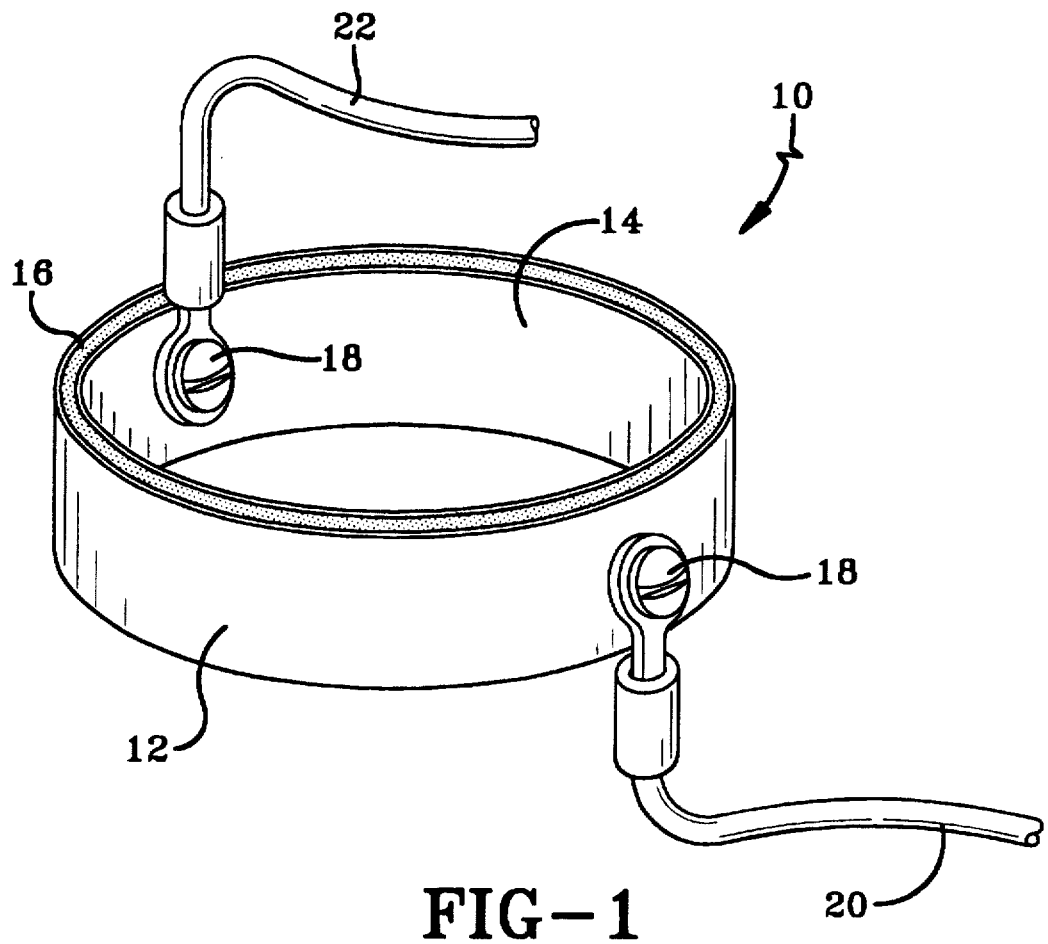
FIG. 1 illustrates an example capacitive sensor according to this invention.

Referring now to FIG. 1, an example sensor according to this invention suitable for use in measuring temperatures over broad temperature ranges including extremely high temperatures is shown. The sensor comprises inner ring 14 and outer ring 12, both conductors such as stainless steel. The inner and outer rings 14 and 12 are circular cylindrical in shape and an example axial length for each is 12.7 mm. The inner diameter of the outer ring 12 is, for example, 52.3 mm, and the outer diameter of the inner ring 14 is, for example, 50.8 mm, giving an average distance between the outer periphery of the inner ring 14 and the inner periphery of the outer ring 12 of 0.75 mm.

A dielectric material 16 is provided in the cylindrical annular space between the inner and outer rings 14 and 12. A preferred example of the dielectric is magnesium phosphate, for example, as provided in the form of Sauereisen Electrotemp #8™ cement, which is commercially available as a powder that can be mixed with a predetermined amount of water to form a paste. When the paste cures, it solidifies, bonding to the inner and outer rings 14, 12, maintaining the rings 14, 12 together in the concentric coaxial alignment shown. Conductive leads 20 and 22 may be attached to the inner and outer rings through any known suitable method and in laboratory samples such conductors were attached by machine screws 18, screwed directly to the rings 12 and 14.

The responsiveness of the device shown to temperature may be explained as follows. The capacitance of a typical capacitor is given by:

$$C(T_0) = \epsilon_0 \epsilon_r(T_0) A(T_0)/S(T_0),$$

where $T_0$ is the reference temperature, $\epsilon_0$ is the permittivity of free space, $\epsilon_r$ is the dielectric constant of the material, A is the area of the metal plates and S is the spacing between the plates. When the temperature increases above the reference temperature, both the metallic plates and the dielectric material expand, effecting capacitance. However, a much stronger effect on the device is that of the temperature on the dielectric constant of the material 16. The same ionic displacement phenomenon that influences the resistivity of a material has a similar affect on the dielectric properties of the same material. The distribution of ionic charges in dielectric is changed from a random to a more ordered form by application of an electric field. Upon removal of the field, the charge is relaxed to the disordered state by thermal agitation, the relaxation time or the time required to reach the final state being dependent upon the ease with which the ions can move or jump from one vacancy to the next.

The dielectric constant and the reactance of the capacitor have strong dependence on operating frequency. It is this additional dependence on frequency that makes the device, shown in FIG. 1, extremely versatile for temperature sensing. At any temperature, the dielectric constant may be given by:

$$\epsilon_r(T) = \epsilon_\infty + (\epsilon_{dc} - \epsilon_\infty)/(1 + (2\pi f \tau(T))^2)$$

where $\epsilon_\infty$ and $\epsilon_{dc}$ are the relative permittivities of the dielectric in high frequency and static applied electric fields, where f is the frequency and where $\tau(T)$ is the relaxation time. The relaxation time $\tau(T)$ is given by $\tau(T) = \tau_0 e^{(\phi/kT)}$, where $\phi$ is an activation energy level that is related to the ease with which the ions can jump from one side to the next, i.e., 1.1 eV, k is the Boltzmann constant and $\tau_0$ is the lower limit on the relaxation time that would be obtained at temperatures such that the ionic thermal energy is much greater than the activation energy (kT>>φ). As can be seen, the relaxation time is temperature dependent. However, capacitance is not only responsive to temperature but also responsive to frequency.

Figure 2:
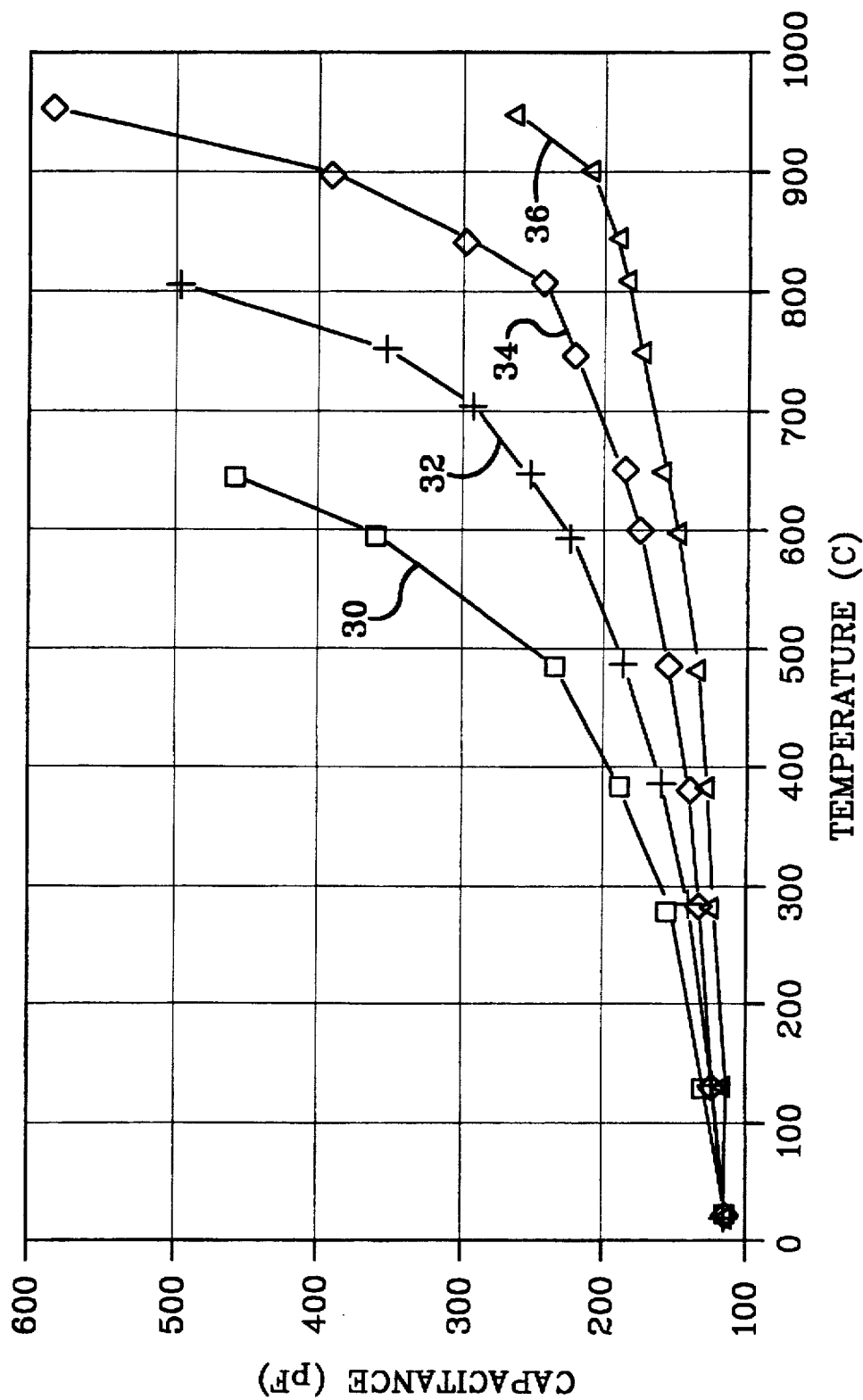
FIG. 2 illustrates the relation between frequency, capacitance and temperature for an example sensor according to this invention.

FIG. 2 illustrates the capacitance response of the device shown in FIG. 1 when it is excited at 100 Hz, 1 KHz, 10 KHz, and 100 KHz, yielding the responses 30, 32, 34 and 36, respectively, as the temperature is varied between 0 and 1000° C. It would appear from the graph in FIG. 2 that low frequency excitation is useful over a high range of temperature sensing. However, as temperature increases, losses increase due to a decrease in resistivity of the material. These losses are typically represented as a dissipation factor or a loss tangent defined as the reactance of the capacitor divided by the resistance of the conductive path across the capacitor. The dissipation factor is defined as follows:

dissipation factor=1/(2πfCR), where R is the resistance of the capacitor. Higher values of the dissipation factor are associated with larger signals going through the conductive path and smaller signals going through the capacitive path, making the measurement of capacitance more difficult. Lower values of the dissipation factor may be restored by decreasing the reactance of the capacitive path, which at any specific temperature may be achieved by increasing the operation frequency.

Thus, over broad range temperature sensing, this invention provides for switching of the frequencies used to excite the capacitor device, increasing the frequency as temperature increases to decrease the reactance.

Figure 3:
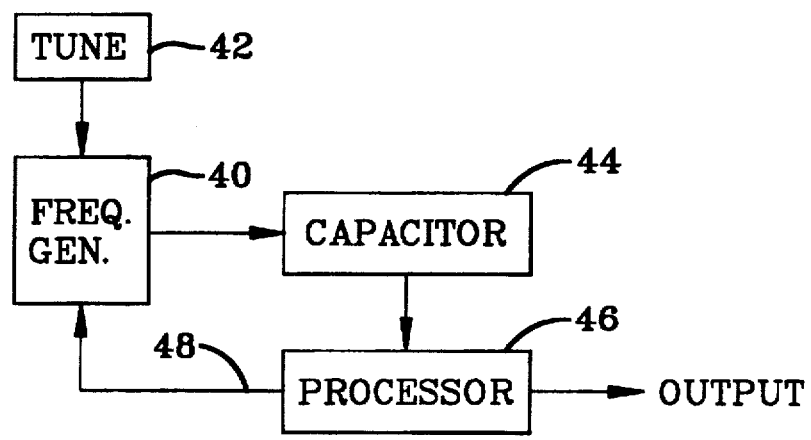
FIG. 3 illustrates an example method and apparatus for utilizing a capacitor sensor according to this invention.

Referring now to FIG. 3, an example implementation of a temperature sensor suitable for broad range temperature sensing, including at high temperatures, is shown. A frequency generator 40 of a known type has a tuning input 42 for adjusting the frequency output thereof. The tuning input provides the advantage of electronically tuning the capacitor device 44, which may be the device shown in FIG. 1. Electronic tuning easily compensates for part-to-part variations by adjusting the output frequency of the generator 40 to a frequency at which the capacitance of the capacitor device 44, at a given temperature, is at a desired level. The frequency generator may be an analog device in which case the tuning input is in the form of a resistor such as a variable resistor. Alternatively, the frequency generator may be a digital device in which case the tuning input is a digital input adjusting the frequency of the frequency generator 40. With the capacitor device 44 excited by the output of the frequency generator 40, the capacitance thereof is measured by a processor 46, which may either be an analog circuit or digital circuit or microprocessor. The processor 46 converts the signals from the output of capacitor 44 into a temperature signal and provides the temperature signal either to a display device or another control within the processor or within another processor to control a function being monitored by the temperature sensing capacitor device 44.

In broad range implementations, when the processor determines that the temperature of the capacitor device 44 reaches a predetermined level, a signal is provided on line 48 to the frequency generator 40, commanding the frequency generator to increase the excitation frequency to the capacitor device 44. With the increase in frequency, the reactance of the device 44 is decreased, decreasing the dissipation factor of the capacitor device and increasing the quality of the output signals provided to the processor 46. Similarly, when the temperature of the capacitor device 44 decreases to a predetermined temperature, the processor provides a signal on line 48 to the frequency generator 40 commanding the frequency generator 40 to lower the frequency of the signal provided to the capacitor device 44 to increase the sensitivity of the device to the lower temperature ranges.

Each frequency change to the frequency generator 40 is accounted for by the processor in converting the measured capacitance to temperature, i.e., by changing look-up table conversion function in the same manner described below with reference to FIG. 4. More particularly, for temperatures below 700° C., the processor 46 can convert the capacitance to a temperature using a look-up table implementing the function 32 in FIG. 2. For temperatures above 700° C., the look-up table implements the function 34 in FIG. 2. While this example uses two frequencies switching at 700° C., three or more frequencies can be used, with additional temperature switching points that will be independently set from system to system depending upon desired accuracy and type of dielectric material used.

In one example the frequency generator 40 is a voltage controlled oscillator (VCO) that provides an output frequency signal responsive to an input voltage. Such devices are well known to those skilled in the art and are often used in radio demodulation circuits. See, for example, U.S. Pat. No. 5,359,661. In this example, the processor 46 provides a digital output signal for a desired frequency. The digital output signal is converted to a voltage signal by a digital to analog converter, and provided as the voltage input to the VCO 40 via line 48. When the frequency output of VCO 40 is desired to be changed, the processor 46 changes the digital output signal to a new value corresponding to another frequency for VCO 40.

Example control steps for a microprocessor implementation of processor 40 are as follows. The output of capacitor 44 (i.e., as processed by the band pass filter, rectifier and low pass filter combination described below with reference to FIG. 4) is read by the processor 40. If the frequency selected, i.e., as indicated by a flag described below designating either high or low, is the high frequency, i.e., 10 KHz, the processor looks up the temperature from a first table implementing the function 34 (FIG. 2). If the frequency selected is the low frequency, i.e., 1 KHz, the processor looks up the temperature from a second table implementing function 32 (FIG. 2). The temperature from the look up table is compared to a threshold, i.e., 700 degrees. If the temperature is 700 degrees or greater, the flag indicating frequency selection is set to high, otherwise the flag is set to low. The processor then outputs the temperature signal to a display or another control device or algorithm as desired and outputs a digital signal responsive to the flag. The digital signal is one of two values, the first value, when the flag is set to high, is provided to a digital to analog converter, which provides a voltage signal to the VCO 40 commanding the high frequency output. The digital output is a second value when the flag is set to low, in response to which the digital to analog converter provides a voltage signal to VCO 40 commanding the low frequency output.

Figure 4:
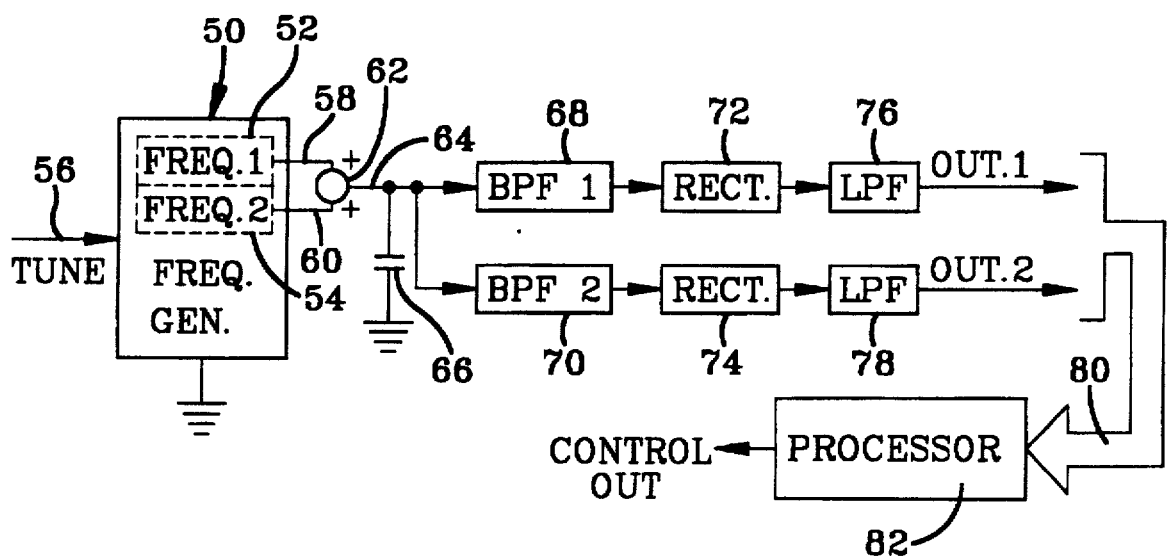
FIG. 4 illustrates a second example method and apparatus for utilizing the capacitance sensor according to this invention.

Referring now to FIG. 4, another example implementation of an apparatus and method for temperature sensing using a capacitor device, for example of the type shown in FIG. 1, is provided. A frequency generator 50 comprises two subunits 52 and 54 for generating signals on line 58 and 60 with frequency 1 and frequency 2 respectively. For example, frequency 1 may be 1 KHz and frequency 2 may be 10 KHz. A tuning input represented by line 56 and may be provided separately for each frequency generator 58, 60 to tune the capacitor 66 for two temperature ranges, one to be measured by the high frequency signal (frequency 2) on line 60 and the other to be measured by the low frequency signal (frequency 1) on line 58.

The frequency signals are summed by summation block 62 and provided on line 64 to the capacitor 66. The voltage across the capacitor 66 is then band pass filtered by filters 68 and 70 having center frequencies at the 1 KHz and 10 KHz levels, respectively. The output of filter 68 is rectified by rectifier 72 and low pass filtered by low pass filter 76 to provide an output signal responsive to the low frequency excitation signal generated by frequency generator 52. The output of band pass filter 70 is rectified by rectifier 74 and filtered by low pass filter 78 to provide a second output signal representative of the response of capacitor 66 to the high frequency excitation signal generated by frequency generator 54.

The outputs of the low pass filters are provided through bus 80 to processor 82, which may be a microprocessor device that reads the low pass filter outputs through an analog to digital converter input of a known type. The control of the processor 82 is selectively responsive to the two different excitation frequencies to select the frequency response dependent on the temperature range of the capacitor device. For example, the frequency response of the low frequency signal from frequency generator 52 may sense temperatures in the range between 300°–700° C., while the high frequency signal can be used to sense temperatures above 700° C.

Figure 5:
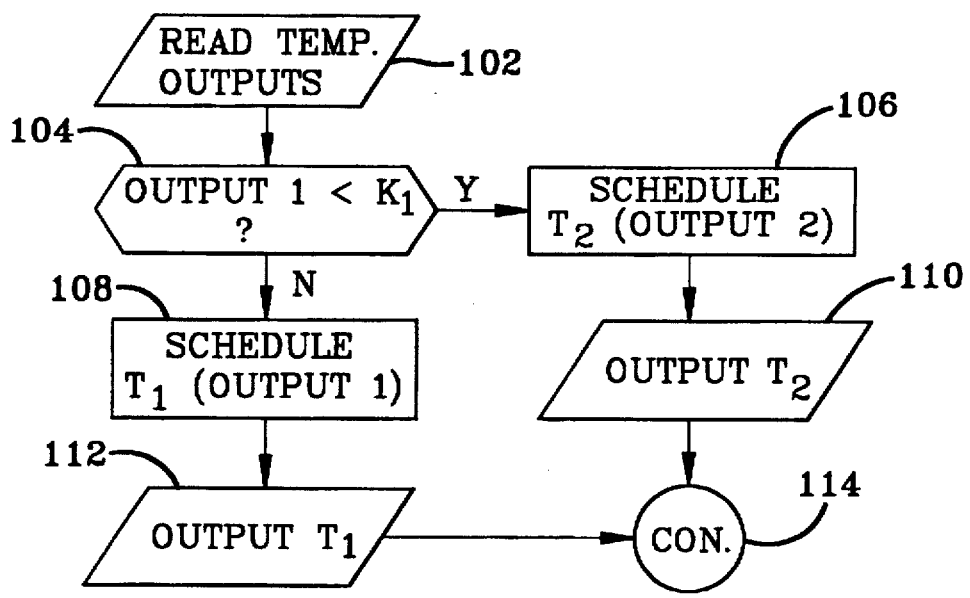
FIG. 5 illustrates an example flow diagram of a control routine implemented by the processor shown in FIG. 4.

Referring now to FIG. 5, an example flow diagram of control by the processor 82 for selecting the frequency response to be monitored is shown. At block 102, the processor reads the temperature inputs on bus 80. At block 104, the processor compares the low frequency output to a predetermined threshold. If the low frequency output is below the threshold K1, the routine continues to block 106 where the temperature T2 is determined as the output of a predetermined look-up table function relating the high frequency output to temperature. Then at block 110, T2 is output either to another control device or another control algorithm within the processor responsive to the temperature of the capacitive device 66.

If at block 104 the output of low pass filter 76 is not less than K1, the routine continues to block 108 where it schedules the temperature output from a second look-up table function responsive to the low frequency response output and provides that output at block 112 to either another processing device or another control algorithm within the processor 82 as the temperature output of capacitive device 66.

The look-up table functions at blocks 106 and 108 are easily calibrated by one skilled in the art by implementing the device shown in FIG. 4 in an experimental oven or other system in which temperature can be controlled. To read temperatures, a thermometer of a different type known to be calibrated accurately is used. The oven is brought to various temperatures and, at each temperature, the temperature values from the thermometer are read and stored in the look-up tables as the output for the observed low pass filter signals. One table (to be used at block 108) corresponds to the output of low pass filter 76 and a second table (to be used at block 106) corresponds to the output of low pass filter 78.

The method and apparatus shown with respect to FIGS. 4 and 5 is responsive to two frequency ranges. If broader temperature ranges are desired or if more accuracy is desired in a particular range, additional frequency ranges may be used and implemented in the same manner described above with respect to FIGS. 4 and 5.

We claim:

1. A temperature sensor apparatus comprising:

a capacitor with first and second conductors and a dielectric material between the conductors;

a frequency generator coupled to the capacitor and providing an excitation signal thereto;

a processor coupled to the capacitor, wherein the processor comprises: means for monitoring a capacitance of the capacitor, means for converting the capacitance to a temperature signal, and means for altering a frequency of the excitation signal when the temperature signal passes a predetermined threshold.

2. A temperature sensor apparatus according to claim 1, wherein the first conductor comprises an inner conductive cylindrical member and the second conductor comprises an outer conductive cylindrical member, wherein the inner and outer conductive cylindrical members are concentrically and coaxially aligned, wherein an outer periphery of the inner cylindrical conductive member is spaced a predetermined distance from an inner periphery of the outer cylindrical conductive member, wherein the dielectric material is located between the outer periphery of the inner cylindrical member and the inner periphery of the outer cylindrical member, wherein the dielectric material is bonded to the inner cylindrical member and the outer cylindrical member and maintains the inner and outer cylindrical members affixed together.

3. A temperature sensor apparatus comprising:

a capacitor with first and second conductors and a dielectric material between the conductors;

a frequency generator coupled to the capacitor and providing an excitation signal thereto, wherein the frequency generator is capable of switching a frequency of the excitation signal between a multitude of frequencies;

a processor coupled to the capacitor, wherein the processor comprises: means for monitoring a capacitance of the capacitor, means for converting the capacitance to a temperature signal, and means for altering a frequency of the excitation signal when the temperature signal passes a predetermined threshold, wherein temperature is detected over a multitude of temperature ranges, and wherein a different frequency of the multitude of frequencies is applied for each different temperature range.

4. A temperature sensor apparatus comprising:

a capacitor with first and second conductors and a dielectric material between the conductors;

a frequency generator coupled to the capacitor and providing an excitation signal thereto, wherein the frequency generator is capable of providing the excitation signal with at least first and second separate frequencies;

a first channel, coupled to the capacitor, comprising a first band pass filter, a first rectifier and a first low pass filter, wherein the first band pass filter passes signals at the first frequency;

a second channel, coupled to the capacitor, comprising a second band pass filter, a second rectifier and a second low pass filter, wherein the second band pass filter passes signals at the second frequency;

a processor coupled to the first and second channels, wherein the processor receives first and second outputs of the first and second channels, selects one of the first and second channels as a selected output, and determines a temperature signal responsive to the selected output, wherein the selected output changes when a temperature of the capacitor passes a predetermined threshold.

* * * * *